Oct. 23, 1951  W. A. MINIX  2,572,368
PNEUMATIC GAUGE FOR PLAIN AND TAPERED BORES
Filed April 24, 1948  4 Sheets-Sheet 1
*Fig. 1*
*Fig. 2*
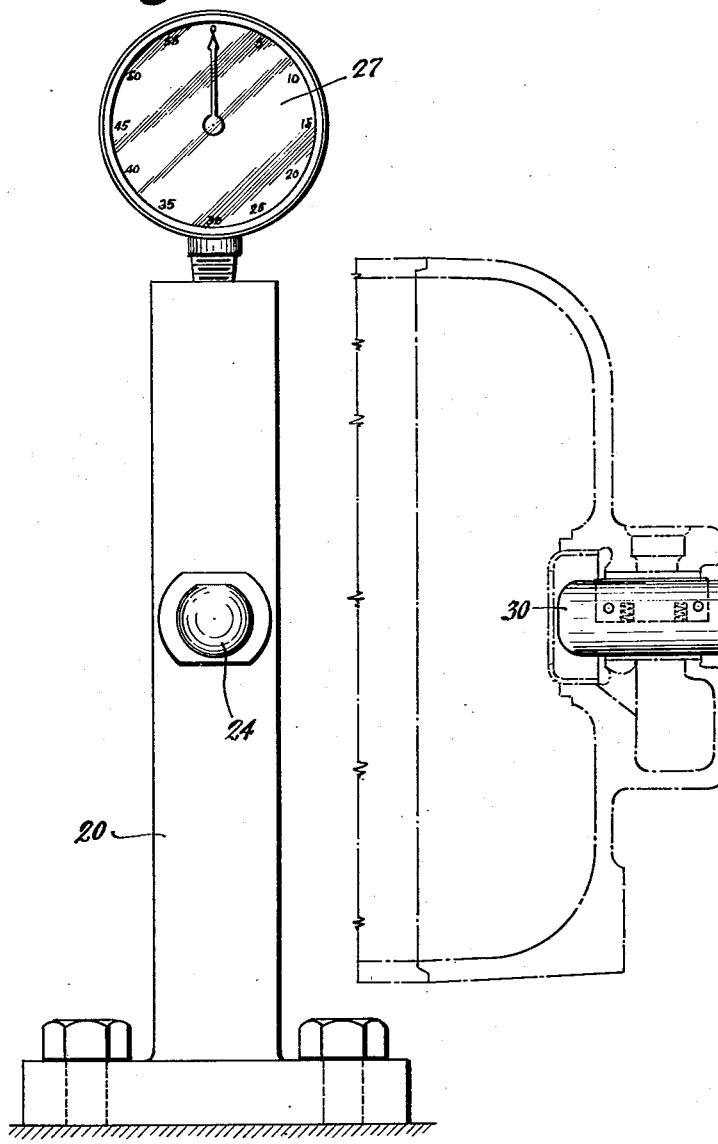
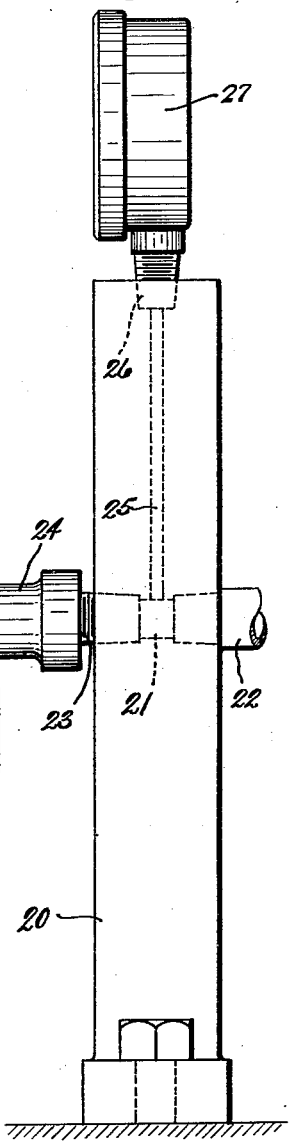
INVENTOR.
WILLIAM A. MINIX
BY
Spencer, Hardman and Feber
HIS ATTORNEYS Oct. 23, 1951 W. A. MINIX 2,572,368
PNEUMATIC GAUGE FOR PLAIN AND TAPERED BORES
Filed April 24, 1948 4 Sheets-Sheet 2
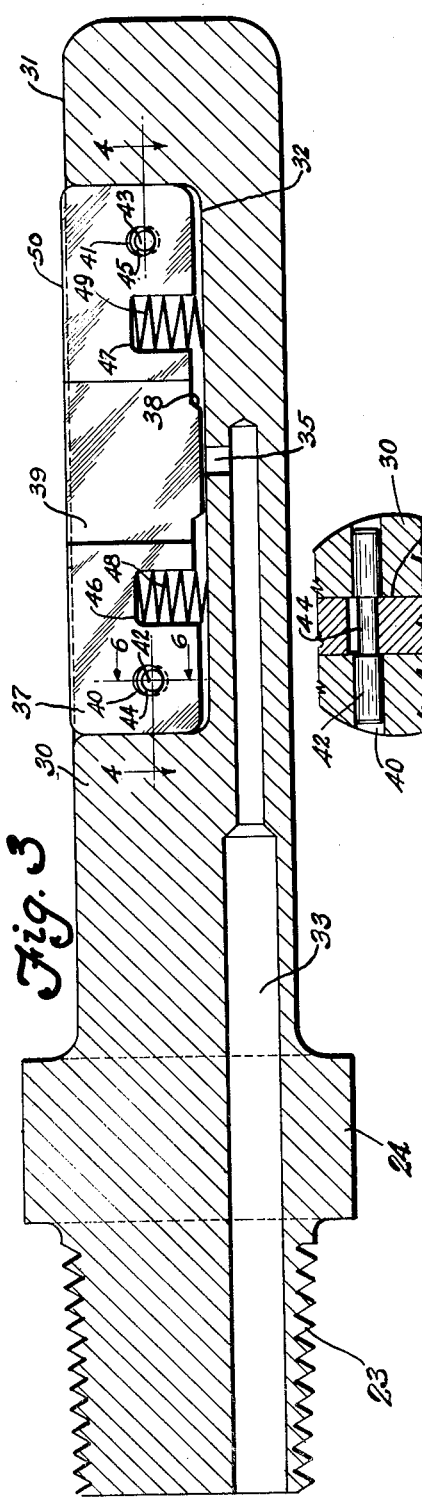
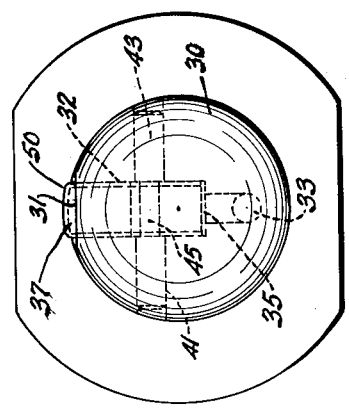
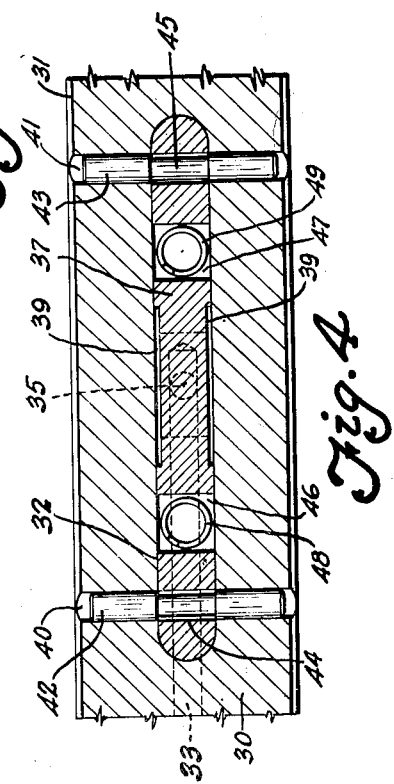
INVENTOR.
WILLIAM A. MINIX
BY
Spencer, Hardman & Files
HIS ATTORNEYS Oct. 23, 1951 W. A. MINIX 2,572,368
PNEUMATIC GAUGE FOR PLAIN AND TAPERED BORES
Filed April 24, 1948 4 Sheets-Sheet 3

INVENTOR.
WILLIAM A. MINIX
BY
Spencer, Hardman & Fisher
HIS ATTORNEYS

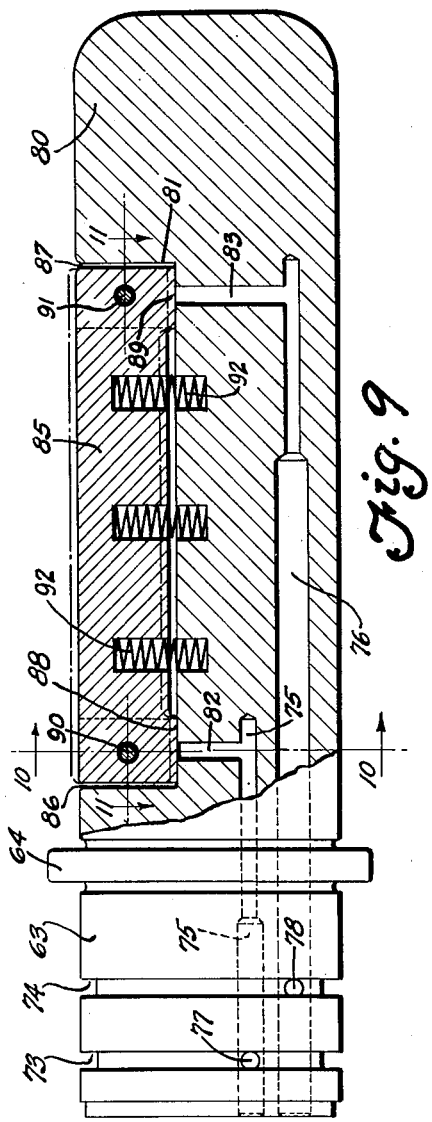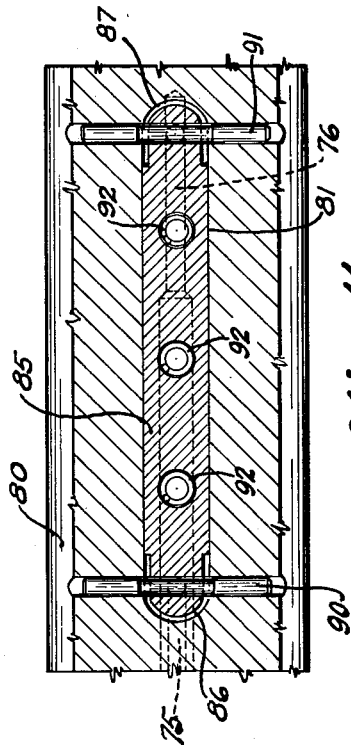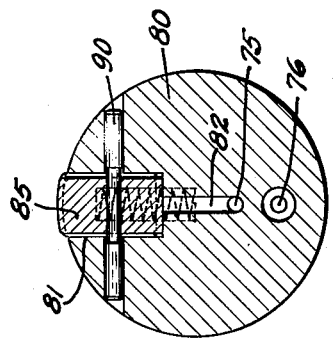

Patented Oct. 23, 1951

2,572,368

UNITED STATES PATENT OFFICE 2,572,368

PNEUMATIC GAUGE FOR PLAIN AND TAPERED BORES

William A. Minix, Dayton, Ohio, assignor to General Motors Corporation, Detroit, Mich., a corporation of Delaware Application April 24, 1948, Serial No. 23,101

10 Claims. (Cl. 33—178)

1

This invention relates to improvements in gauges.

It is among the objects of the present invention to provide a precision gauge capable of indicating accurately variations in the amount of clearance between two of its own relatively movable members whose movements are caused by irregularities in the complementary surfaces of objects to which said members are applied.

Further objects and advantages of the present invention will be apparent from the following description, reference being had to the accompanying drawings, wherein a preferred embodiment of the present invention is clearly shown.

In the drawings:

Fig. 1 is a front view of the gauge.

Fig. 2 is a side view of the gauge, this view showing a bearing in a motor end housing being applied to the gauge.

Fig. 3 is a longitudinal sectional view, at enlarged scale, of the gauge probe insertable into cylinders or round openings for checking them.

Fig. 4 is a detail sectional view taken along the line and in the direction of arrows 4—4 of Fig. 3.

Fig. 5 is an end view of the probe shown in Fig. 3.

Fig. 6 is a fragmentary sectional view taken along the line and in the direction of the arrows 6—6 of Fig. 3.

Fig. 9 is a part sectional view of the probe of the gauge shown in Figs. 7 and 8 which is applied to the object to be checked.

Fig. 10 is a transverse section taken along the line and in the direction of the arrows 10—10 of Fig. 9.

Fig. 11 is a fragmentary sectional view taken along the line and in the direction of the arrows 11—11 of Fig. 9.

Figure 7:
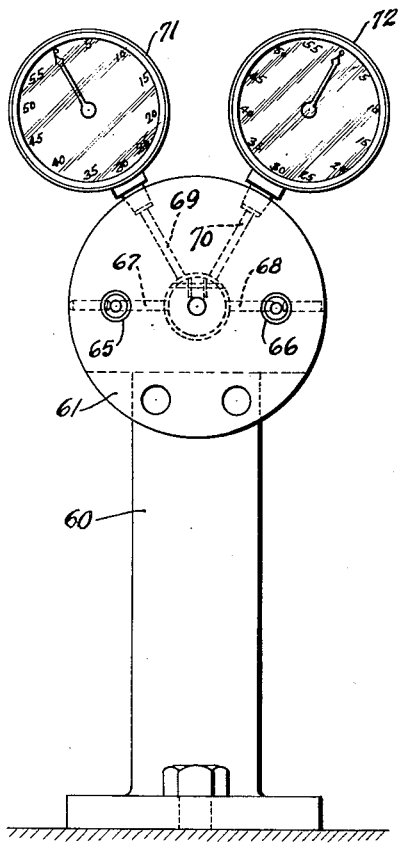
Fig. 7 is a front view of a modified form of gauge in which two indicators are provided. This form of gauge will indicate characteristics in the surfaces of objects being tested which will not be indicated by the form of gauge shown in Figs. 1, 2 and 3.

Gauges in which air flow between a predeterminately sized probe of the gauge and the complementary surface of the object being tested is measured to ascertain the clearance between said block and surface are well known in the art. Such a gauge for measuring cylinder bore, for instance, would comprise a cylindricaly shaped

2 predeterminately sized probe having a conduit to which a source of fluid presure is connected. An annular groove in the outer, peripheral surface of the probe is in communication with the conduit so that the air pressure may exhaust through said groove. The size of the groove or its communication with the conduit may be such that when the air pressure is turned into said conduit its exit through said communication or groove will be restricted so that a pressure indicator, connected to the conduit will show a normal back pressure existing in said conduit. For purpose of illustration let it be assumed that the indicator shows a normal back pressure of 10 pounds. Let it also be assumed that allowable back pressures shown by the indicator during tests are 20 to 30 pounds. When a cylinder placed over the gauge probe is so small that the annular clearance space between the probe surface and the complementary surface of the cylinder restricts air exhausting from the plug to cause the indicator to show a back presure in excess of 30 pounds then such a cylinder is discarded as being too small. On the other hand a cylinder too large in diameter will not sufficiently restrict the exhaust of air from the probe to cause the indicator to show a back presure of less than 20 pounds thus indicating failure of this cylinder to meet requirements. Any cylinder providing clearance which offers restriction to air flow sufficient to cause a back pressure of from 20 to 30 pounds to be indicated would be considered as acceptable for use.

The gauge of the present invention does not utilize the clearance space between the probe of the gauge and the complementary surface of the object being tested as a throttle means for restricting the air flow to build up a back pressure for indicating purposes. On the contrary the probe of the present gauge has an exploring element or insert movable therein and yieldably urged into direct engagement with the complementary surface of the object to be tested. This exploring element or insert has a portion which operates to throttle or control air flow from the exhaust port of a duct within the probe itself, such throttling of the air flow causing a back pressure to be built up within said duct in accordance with the adjustment of the exploratory element or insert by the said complementary surface which it engages.

Comparative tests have shown that in general use, instruments utilizing the clearance space between the gauge probe and the complementary surface of the object being tested for air flow restricting purposes to build up an indicated back pressure are not as precise as the instrument of the present invention in which the air flow is restricted within the probe itself and by an element which directly engages the complementary surface of the object being tested and is adjusted by said surface to control the air flow restriction in accordance therewith.

The gauge of the present invention is considered an instrument of greater precision than the aforedescribed, well known instrument for the following reasons: A machined surface is never perfectly smooth, but on the contrary more or less rough, dependent upon the method of machining and the quality of the workmanship. For instance a surface produced by broaching is generally much smoother than a surface produced by boring. Machined surfaces have "peaks and hollows" which are microscopic in some instances and of a microscopic degree particularly in surfaces produced by boring tools used in commercial production of parts in comparatively large numbers. Surface roughness is measured in micro inches by instruments among which is the "brush analyzer." A comparatively smooth and fairly well polished surface when tested by the brush analyzer will show a roughness of about 20 to 30 micro inches R. M. S. (root mean square). This means that the "peaks and hollows" of such a surface are of microscopic degree and that objects having a complementary surface of such a quality could be checked substantially as accurately by the aforedescribed well known gauge as by the gauge of the present invention.

However, as the degree of roughness of surface increases, that is, as the size of the "peaks and hollows" increase and the amount in micro inches R. M. S. increases, then the well known instrument becomes less dependable while on the other hand the gauge of the present invention maintains its precision qualities. This is true because the well known instrument utilizes the clearance space between the probe and the complementary surface of the object being tested for restricting air flow to build up an indicated back pressure. The clearance space between the surface of the probe and the tips of the "peaks" in the complementary surface of the object being tested is not the true air flow restricting space but on the contrary the widths and depths of the "hollows" are also a controlling factor. The actual size of the air flow restricting space is a mean line somewhere between the tip of the "peak" and the bottom or root of the "hollow." Thus the true clearance space between the predeterminately sized probe and the tips of the "peaks," which tips should, in the case of a bearing, eventually provide the supporting surface of the shaft journalled in said bearing, is not precisely indicated, but on the contrary the clearance is indicated as being between the probe surface and the mean line determined by the degree of roughness of the surface tested. By this it may be seen that the old gauge renders a false indication of clearance, which is exaggerated with increasing degrees of roughness in the surface being tested while on the contrary such roughness has no effect on indication made by the gauge of the present invention for in it only a mechanical contact is made with the "peaks" in the tested surface and no governing air flow strikes them.

A better understanding of the construction and mode of operation may be had by referring to the accompanying drawings in which the numeral 20 designates a standard of any suitable design. A threaded passage 21 in the standard receives one end of a pipe 22 connected to any suitable source of fluid pressure and also the threaded nipple 23 of the plug 24 of the gauge. For purposes of illustration, this plug 24 is shown in the form of a cylindrically shaped member for testing bearings, round holes and cylindrically shaped objects, however, said plug would be ring shaped in case round studs, shafts or bodies are to be tested. The standard 20 has a duct 25 communicating with passage 21 and terminating in a threaded port 26 into which the nipple of the air pressure indicator 27 is threaded.

The plug 24 of the gauge is detailedly illustrated by the Figs. 3 to 6 inclusive. It has a cylindrically shaped probe 30 ground to a predetermined diameter so as to be insertable into objects having a cylindrical opening for purposes of determining the differences in the diameters of the probe portion 30 and the opening of the object being tested. For purposes to be described probe 30 has a flat surface 31 provided in its outer peripheral surface. It also has a central, longitudinal recess 32 and a longitudinal duct or passage 33 the one end of which terminates in the outer end surface of the nipple 23 so as to be in communication with the passage 21 in the standard, the other end of said duct 33 terminating in an exhaust port 35 in the bottom wall of the recess 32 so that said duct 33 may discharge fluid or air into said recess.

An insert 37, operative as an explorer, fits in the recess 32 and is slidable therein substantially radially of the probe 30. This insert has a lip 38 adapted to seat upon the bottom surface of the recess 32 to close the exhaust port 35. The engaging surfaces of the lip 38 and recess 32 are highly polished and exceedingly smooth so that peaks and hollows usually found in a machined metal surface are at a minimum. A shallow recess 39 is provided in each longer opposite side of the insert to provide a fluid exhaust passage connecting the space in the recess around the exhaust port 35 with the exterior of the probe 30.

When assembling the probe the insert 37 is slid into the recess 32 until the surface of the lip 38 engages the bottom wall of said recess. While securely holding the insert in the recess two transverse holes 40 and 41 are bored through the probe and its contained insert. A snugly fitting pin is then driven through each of these holes, whereby the insert is rigidly held in the probe. Then the outer surfaces of the probe and insert are ground so that the insert is of a predetermined diameter and the outer surface of the insert is flush therewith. After the grinding operation is completed, the holding pins in holes 40 and 41 are removed, being replaced by pins 42 and 43 each shorter than the length of the hole into which placed. The portion of pins 42 and 43 within the confines of the holes in the probe itself fit tightly therein so as not to be removable accidentally. The portion of each pin extending through the hole in the insert is predeterminately reduced in diameter so as to form an annular groove 44 and 45 in each respective pin each groove being of a predetermined depth. As indicated in the Figs. 3 and 6, the grooves in the pins 42 and 43, permit the insert to move relatively to the probe, that is to slide up and down in the recess of said probe as viewed in Fig. 3. The movement of the insert outwardly of the probe 30 is limited by the pins said insert being movable outwardly so that its outer surface extends beyond the surface of the probe itself a distance equal to the predetermined depth of the annular grooves 44 and 45 in the respective pins 42 and 43. Recesses 46 and 47 in the surface of the insert opposite its extending surface contain springs 48 and 49 respectively, which engage the bottom of the recess and yieldably maintain the insert in normal position in which its outer surface provides an exploratory element extending beyond the outer surface of the probe 30 insertable in a cylindrical opening. This extending portion of the insert is designated by the numeral 50.

It will of course be apparent to a skilled mechanic that straight diameter pins may be used instead of the grooved pins 42 and 43 aforedescribed. In this case, the holes in the insert 37 must be elongated predeterminately in order to permit the insert to move outwardly of the probe the predetermined distance under the effect of the springs 48 and 49.

The gauge just described is used in the following manner:

Suppose bearings as shown in Fig. 2 are to be checked for inside diameter and that this particular bearing is to provide a journal for a shaft substantially one-half inch in diameter. Allowable tolerances for the inside diameter of the bearing are maximum .5003 and minimum .4999 of an inch. For these sizes and tolerances the probe 30 would be substantially .4989 of an inch in diameter and the insert would extend beyond the surface of the probe substantially .0015 of an inch.

For purposes of this description supposing that when the air pressure is turned on to flow through duct 33 and out of its exhaust port 35 and that the normal position of the insert is such that its lip 38 restricts the flow of air from the exhaust to raise a back pressure within the duct shown by the indicator to be substantially 10 pounds. Now if the probe is inserted into a bearing and the indicator still registers a 10 pound back pressure, it indicates that the inside diameter of the bearing is substantially .5004 or plus, of an inch showing the bearing diameter to be too large for acceptance. Under this circumstance the exploratory element or insert 37 has not been adjusted relatively to the probe due to the failure of the complementary surface of the bearing to engage and actuate said insert. Thus the normal, minimum restriction to air flow from the exhaust port is maintained and the normal back pressure of 10 pounds indicated. On the other hand, when the probe is inserted into the bearing and the indicator registers a back pressure in excess of say 35 pounds then the operator knows that the inside diameter of the bearing being tested is less than the allowable tolerance of .4999 of an inch, designating that the bearing is too small to pass inspection. A back pressure of 35 pounds would indicate that the bearing is substantially .4999 of an inch inside diameter coming within the allowable minimum tolerance. By these adjustments the gauge would indicate bearing diameters of substantially .5003 at 15 pounds back pressure, .5002 at 20 pounds, .5001 at 25 pounds, .5000 at 30 pounds and .4999 at 35 pounds. Any back pressures less than 15 pounds and more than 35 pounds would indicate an unacceptable bearing. These figures are merely illustrative inasmuch as the gauge may initially be calibrated at other values by which certain back pressures indicate precisely, proven relative diameters of openings in the object being tested.

It will be noted that here, no regulating air flow passes between the probe and the complementary surface of the object being tested, but from a throttled exhaust port within the probe itself, the probe having a movable exploratory element adapted to engage the said complementary surface and be adjusted thereby relatively to the probe, said exploratory element, while being adjusted variably restricting air flow from the said exhaust port and thus causing corresponding back pressures to be registered by the indicator. Thus peaks and hollows in the said complementary surface of the object being tested can have no contradictory effects on indicated clearances between the probe itself and the complementary surface of the object being tested for reasons mentioned. On the contrary, the accuracy of the present gauge is not affected by the degree of roughness of the object being tested but it will indicate precisely the actual clearance between the probe and the nearest point in the complementary surface of the object being tested and engaged by the exploratory element or insert.

When the probe is inserted into a cylindrical opening the slight flat 31 on said probe provides a clearance space between the probe and said opening wall and along both sides of the extending portion 50 of insert 37 which space is in communication with the exhaust recesses 39 on each side of the insert. This provides an exit path for the air passing from the exhaust port 35 past the throttling lip 38 of the insert.

The gauge described is adapted to indicate a general over all diametrical size of a cylindrical opening. Due to the fact that the insert 37 throttles a single exhaust port, located substantially midway between the ends of the insert, it would not function to indicate such characteristics as taper or variations in diameter at different points longitudinally of the cylindrical opening being tested. The device illustrated by Figs. 7 to 11 inclusive will, however, indicate such variations. In principle, this device is identical with the instrument already described.

Figure 8:
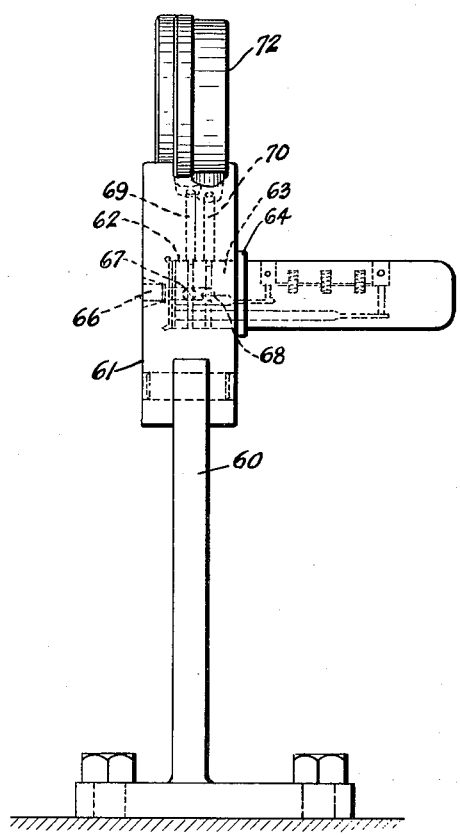
Fig. 8 is a side view of the gauge shown in Fig. 7.

Referring to Figs. 7 and 8, the modified form of gauge is shown having a standard 60 with a head member 61 attached thereto. Head 61 has an axial recess 62 on one side, into which the one end 63 of the gauge probe 64 is fitted. Two threaded ports 65 and 66, on the side of head 61 opposite recess 62, each are adapted to receive a pipe leading from a source of air pressure. A passage 67 in the head connects port 65 with the interior of recess 62 and a similar passage 68 connects port 66 with said recess. Passages 67 and 68 open into the recess 62 at diametrically opposite sides and they are also out of axial alignment as shown in Fig. 8. Two radial passages 69 and 70 are provided in head 61, each passage having an outside, threaded port and each opening into the axial recess 62, the passage 69 in alignment with passage 67, passage 70 aligning with passage opening 68. An air pressure indicator 71 has a nipple threaded into the outside port of passage 69, and a similar pressure indicator 72 is connected with passage 70.

The end 63 of probe 64 fits tightly into the axial recess 62 of the head 61. Said portion 63 of the probe has two annular grooves 73 and 74 in its outer peripheral surface groove 73 communicating with passage openings 67 and 69 and groove 74 with passage openings 68 and 70 when said portion 63 is fully positioned within the recess 62.

The probe 64 has two separate, longitudinal passages 75 and 76, the passage 75 being in communication with groove 73 by a duct 77 and passage 76 being connected with groove 74 by a duct 78. The portion 80 of the probe is that which is adapted to be introduced into a cylindrical opening to be tested. Probe 80 has a longitudinal recess 81 substantially centrally thereof. A duct 82 connects passage 75 with recess 81 and a similar duct 83 connects passage 76 with said recess. Both ducts 82 and 83 open in the bottom wall surface of said recess one adjacent one end of the recess and the other adjacent the opposite end thereof.

The recess 81 in probe 80 has an exploratory element or insert 85 fitted therein so as to be slidable, substantially radially of the probe, said insert 85 being relieved at each end to form spaces 86 and 87 between the respective ends of the insert and the adjacent end wall of the recess.

The edge of insert 85 in juxtaposition to the bottom surface of recess 81, has extending lip portions 88 and 89 at its respective ends. These lip portions 88 and 89 are operative to control or throttle air flow passing from the respective exhaust ports of the ducts 82 and 83 into the recess. Both the surfaces of the lip portions 88 and 89 as well as the bottom surface of the recess 81 engaged thereby are highly polished, smooth finish surfaces so as to reduce to a minimum the peaks and hollows more or less present in all finished surfaces. The insert 85 is assembled and retained in the recess 81 in the same manner as the insert 37 in recess 32 of the first described instrument. Pins 90 and 91 adjacent respective ends of insert 85 permit the insert to move a limited distance relatively to the probe 80. Springs 92 normally, yieldably urge said insert so that it extends out of said probe a predetermined distance. When the lips 88 and 89 of the insert seat upon the bottom surface of the recess 81 they completely close the exhaust ports of ducts 82 and 83 and at the same time the outer edge of the insert is flush with the outer peripheral surface of the probe 80 which is ground to a predetermined diametral size.

As has been stated before, both instruments described are the same in principle, that is, both have a probe applicable to the object to be tested, said probes each having an exploratory element or insert yieldably urged directly to engage the complementary surface of the object being tested. Each insert acts also as a throttling element or valve for controlling air flow from an exhaust within the probe itself so that back pressures are built up and indicated for determining clearances between two members of the instrument, relatively movable by the engaged surfaces of the objects being tested.

The instrument having an insert 85 operative to control two spaced air flow exhaust ports is capable of determining taper in the cylindrical opening into which the probe is inserted whereas the first described instrument is capable of determining only the general diametral dimension of such an opening. If the cylindrical opening into which probe 80 is inserted is smaller in diameter at one end than at the other, then air flow from one exhaust port is restricted to a greater degree than from the other so that one indicator 71 or 72 will show a greater back pressure than the other showing that the opening tested tapers, being of a larger diameter at one end than at the other. Each indicator 71 and 72 will indicate, by existing back pressures, the clearance between a respective end of the cylindrical opening and the adjacent probe portion.

From the foregoing it will be seen that the present invention provides instruments of precision for testing or gauging objects for size, the degree of roughness of the surfaces of said objects being tested having no material effects upon the test, thereby avoiding the usual computations necessary to compensate for inaccuracies prevailing in the use of other air flow indicating gauges.

While the embodiment of the present invention as herein disclosed, constitutes a preferred form, it is to be understood that other forms might be adopted, if within the scope of the claims which follow.

What is claimed is as follows:

1. In a device for testing the size and character of an opening in an object, the combination with a gauge plug insertable into said opening and having a longitudinal recess; a duct in the plug, adapted to have a source of fluid pressure connected thereto and provided with an exhaust port for discharging fluid into the longitudinal recess in the plug; an insert fitting into said recess and slidable therein substantially radially of the plug; equal size, transverse openings in the plug and insert, said openings aligning when the outer edge of the insert is flush with the outer surface of the plug and the inner, opposite surface of the insert substantially closes the exhaust port; a pin extending through the aligned openings, the pin fitting snugly into the openings in the plug and having its portion extending through the opening of the insert, of reduced diameter whereby said insert may move outwardly in the plug, so that its outer edge extends beyond the surface of the plug a predetermined distance and its inner edge is correspondingly spaced from the exhaust port; a spring interposed between the plug and insert yieldably maintaining the insert in its extreme outward position relatively to the plug; and means for indicating existing fluid pressures in the duct.

2. In a device of the character described, the combination with a plug insertable into an opening; said plug having a longitudinal recess; two separate ducts in said plug, each having a source of fluid pressure connected therewith and each having an exhaust port opening into the bottom of said recess, one adjacent its one end and the other near the opposite end of the recess; an insert fitting into the recess and slidable therein toward and away from the bottom of said recess, said insert having provisions at each end for restricting the flow of fluid from the exhaust port adjacent thereto; transverse pins in the plug extending through the insert at each end, said pins limiting the movement of the insert out of the recess of the plug, resilient means between the plug and insert; yieldably maintaining said insert at the extreme outward position as limited by the pins in which position the insert extends a predetermined distance out of the plug and is spaced a predetermined distance from the exhaust ports of the ducts; and means connected to each duct for separately indicating the existing pressures therein.

3. In a device of the character described, the combination with a member adapted to be applied to an object for testing purposes; a recess in said member; two separate ducts in said member, each connected to a source of air pressure and each discharging into said recess at separated points therein; an insert fitting into the recess, slidable therein substantially radially of the said member; means provided by said insert for variably restricting air flow from said ducts into the recess; retaining means in said member engaging the insert to limit the movement of said insert outwardly of said member; resilient means interposed between the insert and said member, yieldably urging the insert outwardly to engage the retaining means, at which time said insert provides the minimum restriction to air flow from the ducts into the recess; and independent air pressure indicators for showing existing back pressure in said ducts.

4. In a device of the character described, the combination with a probe adapted to be applied to an object to be tested; of a recess in said probe; a plurality of ducts in said probe each connected to a source of air pressure and each having an exhaust port opening into the recess; an insert slidable in said recess and having a plurality of separate provisions each operative, as the insert is moved relatively to the probe, variably to restict the air flow from respective exhaust ports; restraining means in the probe, engaging the insert to limit its movement in the exhaust port opening direction; springs between the insert and probe yieldably maintaining the insert in the position in which the exhaust ports are opened widest by said insert; and a separate air pressure indicator for each respective duct.

5. A precision gauge adapted to be used in combination with a fluid pressure indicator connected to a source of fluid pressure, said gauge consisting of two relating movable members one of which is a one piece plug insertable into the object to be tested and having a recess in the surface thereof contiguous to the tested object, one wall of said recess having fluid conducting means terminating therein and connectible with fluid pressure indicating means, the second member being a resiliently supported block slidably fitting into and substantially filling said recess, the outer, exposed surface of said block being flat in one direction and arcuate in the other so as to coincide with the contour of the plug, said block being engageable with the object being tested, another surface of said block providing a valve which cooperates directly with the wall of the recess surrounding the fluid conducting means for controlling the discharge of fluid from said conducting means; and movement limiting abutment means extending transversely through the plug and block, operative to limit predeterminately, the outward travel of the resiliently supported block.

6. In a device of the character described, the combination with a one-piece plug insertable into an opening to be tested, and having a recess in its outer peripheral surface; of fluid conducting means in the plug opening into said recess and adapted to discharge fluid under pressure thereinto; a one piece block fitting slidably into and substantially filling said recess, the outer, exposed surface of the block which engages the complementary surface of the opening being tested, being longitudinally flat and transversely arcuate to coincide with the contour of the plug, the inner, opposite surface of the block being contiguous to and cooperating directly with the bottom surface of the recess for controlling fluid discharge from the fluid conducting means in accordance with the position of the block in the recess; equal size transverse openings in the plug and block, said openings aligning when the outer surface of the block is flush with the adjacent surface of the plug and the inner surface of the block engages the inner surface of the recess; a pin extending through said aligned opening, said pin having end portions fitting snugly within the openings in the plug and a reduced diameter portion in the opening of the block to provide clearance therein permitting limited movement of the block relatively to the plug; resilient means interposed between the block and plug yieldingly urging said block outwardly of the plug; and means connected to the fluid conducting means for indicating existing pressures therein.

7. In a device for testing the size and character of an opening in an object, the combination with a one piece plug insertable into the opening of the object, said plug having a recess in its outer, peripheral surface; fluid conducting means in said plug, terminating in said recess and adapted to be connected with a source of fluid under pressure and with a pressure indicator; an insert slidably fitting into and substantially filling said recess and operative to restrict, to a maximum degree, fluid flow into the recess when the outer surface of the insert is substantially flush with the surface of the plug; resilient means interposed between the plug and insert, operative to urge the insert outwardly of the plug; abutment means supported by the plug and extending into the insert for predeterminately limiting the outward movement thereof; and fluid discharge means provided by the insert and plug for conveying fluid from said recess.

8. In a device for testing the size and character of an opening in an object, the combination with a one piece plug insertable into the opening of the object, said plug having a recess in its outer, peripheral surface; fluid conducting means in said plug, terminating in said recess and adapted to be connected with a source of fluid under pressure and with a pressure indicator; a feeler block slidably occupying the entire recess, said block restricting fluid flow into the recess at the maximum degree when the outer surface of the block is flush with the outer surface of the plug; spring means interposed between the block and plug, yieldably urging the block outwardly of the plug; abutment pins carried by the plug and extending into openings in the block, said pins predeterminately limiting the outward movement of the block by said spring means, and fluid escape means for the recess, provided by recessed areas in the surface of the block engaging the walls of the recess and a communicating channel in the outer surface of the plug.

9. A precision gauge adapted to be used in combination with a fluid pressure indicator connected with a source of fluid pressure, said gauge consisting of a one piece plug applicable to an object to be tested, said plug having a recess in its outer surface; fluid conducting means connectible with the indicator and terminating in the bottom wall of the recess; a block slidably fitting into and substantially filling said recess, the wall of said block adjacent the bottom wall of the recess restricting to a maximum degree, the flow of fluid into said recess, when the opposite, exposed wall of said block is flush with the outer surface of the plug; resilient means interposed between the bottom of the recess and the block, yieldably urging the block outwardly of the plug; and a lost motion connection between the block and plug permitting the block to move relatively to the plug but limiting outward movement of said plug, said connection consisting of a pin extending through aligned and equal diameter holes in the plug and block, the pin portion in the block being of predeterminately lesser diameter than the opening in the block.

10. A precision gauge adapted to be used in combination with a fluid pressure indicator connected with a source of fluid pressure, said gauge consisting of a one piece plug applicable to an object to be tested, said plug having an elongated, radial recess, longitudinal thereof; fluid conducting means in the plug dischargeable into said recess, said means being connectible with fluid pressure indicating means and a source of fluid pressure; a feeler block slidably fitting into and substantially filling said recess, the outer, exposed surface of said block being longitudinally flat and transversely arcuated to coincide with the surface of the plug, the opposite, inner surface of said block providing means restricting at a maximum degree the fluid discharged into the recess, when said exposed surface is flush with the outer surface of the plug; springs interposed between the block and bottom of the recess, yieldably urging said block outwardly of the plug; abutment means inserted in the plug transversely thereof and extending into the block, said means being operative predeterminately to limit the outward movement of the block by the springs; and constantly open fluid escape means provided by the block and plug for the discharge of fluid from said recess.

WILLIAM A. MINIX.

REFERENCES CITED

The following references are of record in the file of this patent:

UNITED STATES PATENTS

| Number | Name | Date |
|---|---|---|
| 1,643,570 | Bartholdy | Sept. 27, 1927 |
| 1,652,854 | Darlington | Dec. 13, 1927 |
| 2,139,282 | Poock et al. | Dec. 6, 1938 |
| 2,268,579 | Eisele | Jan. 6, 1942 |
| 2,374,154 | Moore | Apr. 17, 1945 |
| 2,375,600 | Wattebot | May 8, 1945 |
| 2,413,841 | Minuto | Jan. 7, 1947 |
| 2,490,375 | Rupley | Dec. 6, 1949 |
| 2,490,376 | Rupley | Dec. 6, 1949 |
| 2,501,965 | Rupley | Mar. 28, 1950 |